G. W. BUCK.
CEMENT BLOCK MACHINE.
APPLICATION FILED JULY 9, 1907.
900,910.
Patented Oct. 13, 1908.
5 SHEETS—SHEET 1.
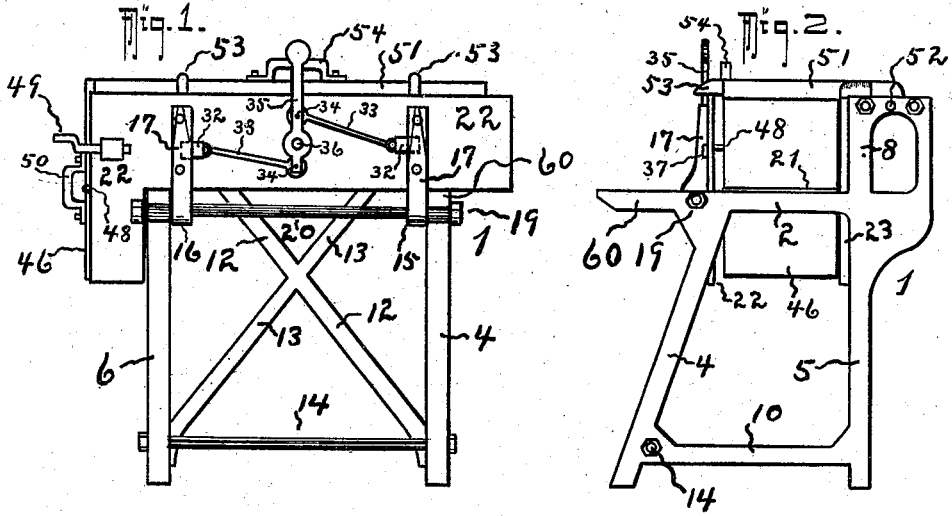
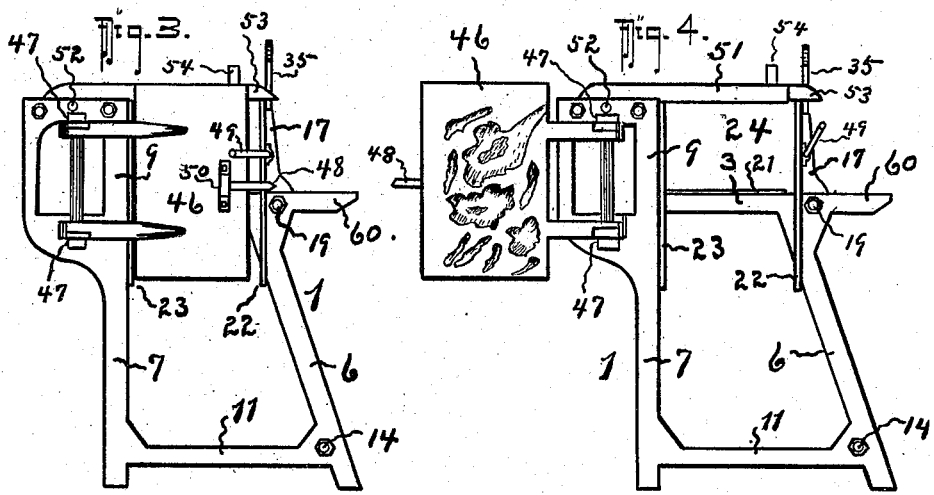
Witnesses
Arthur Sturges
J. A. Broadwell
Inventor
George W. Buck,
Hiram A. Sturges,
By
Attorney

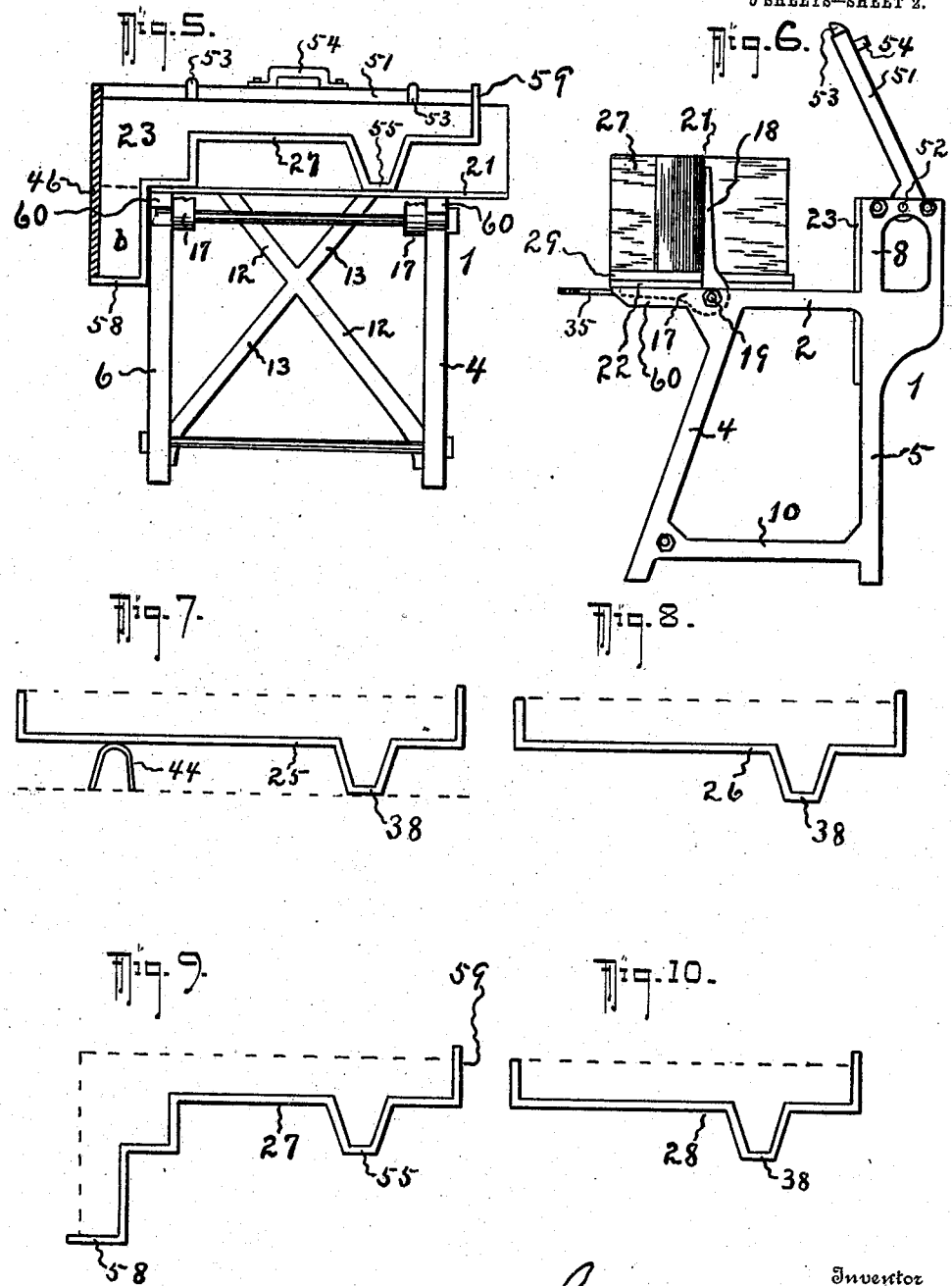

G. W. BUCK.
CEMENT BLOCK MACHINE.
APPLICATION FILED JULY 9, 1907.
900,910.
Patented Oct. 13, 1908.
5 SHEETS—SHEET 3.
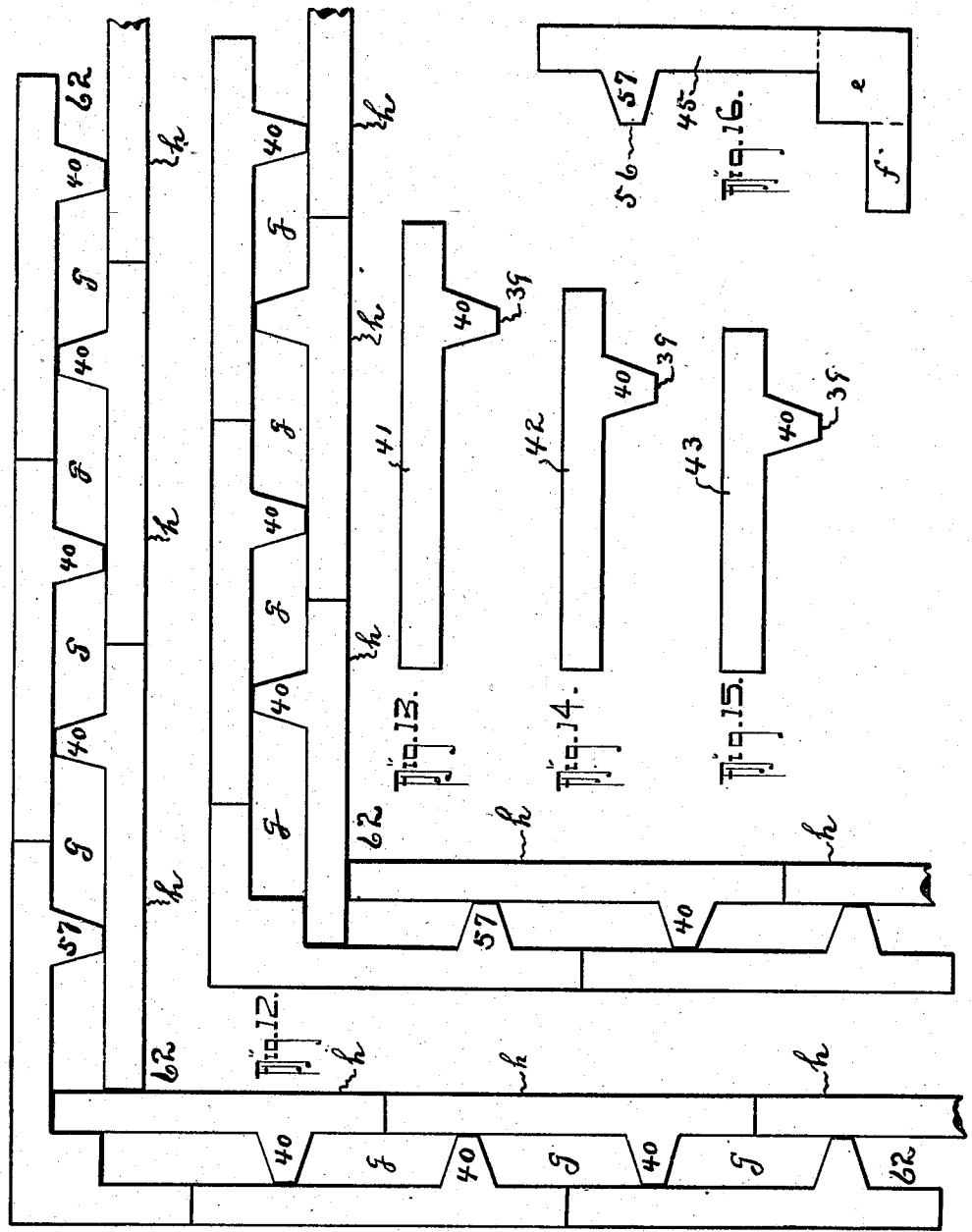

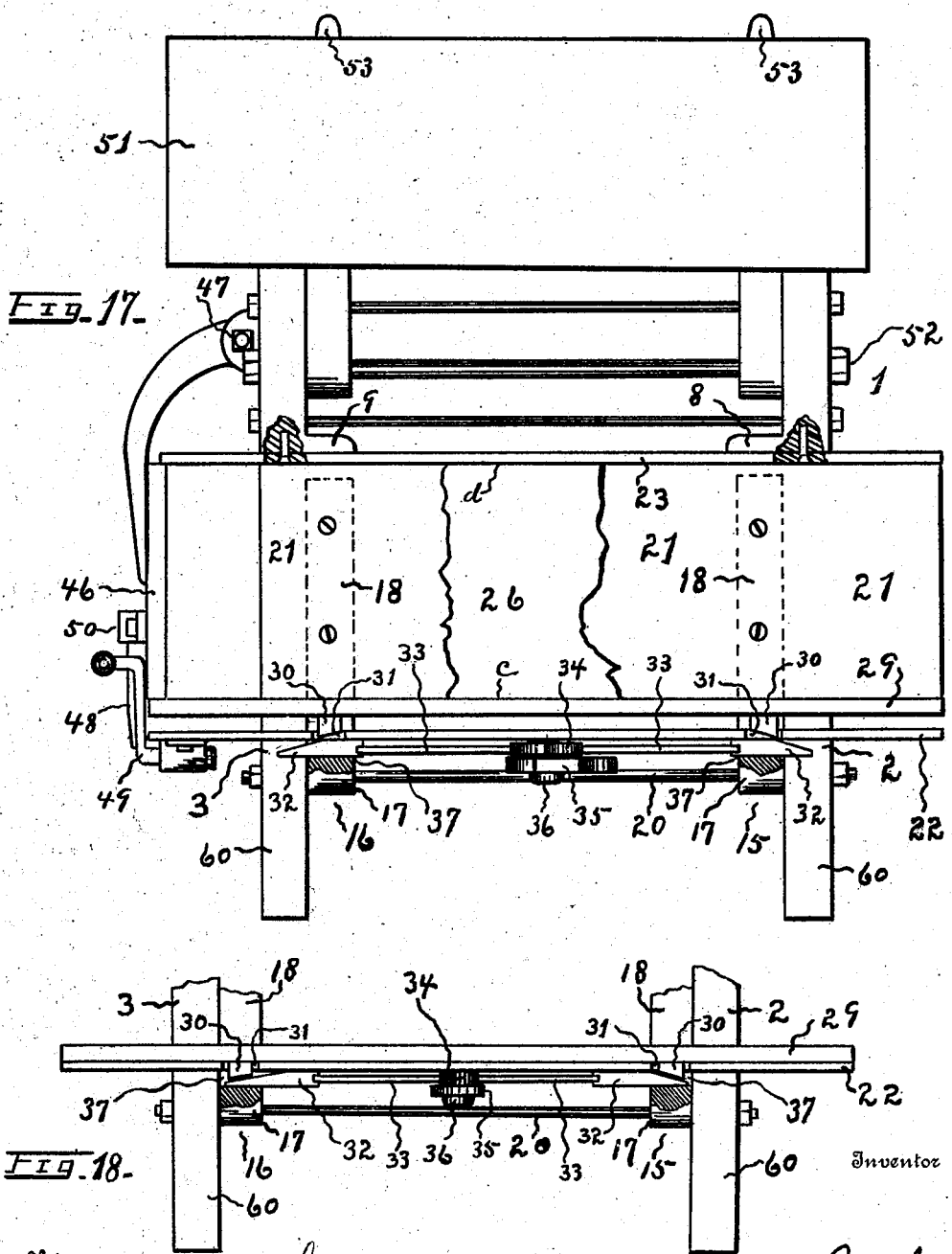

G. W. BUCK.
CEMENT BLOCK MACHINE.
APPLICATION FILED JULY 9, 1907.
900,910.
Patented Oct. 13, 1908.
5 SHEETS—SHEET 5.
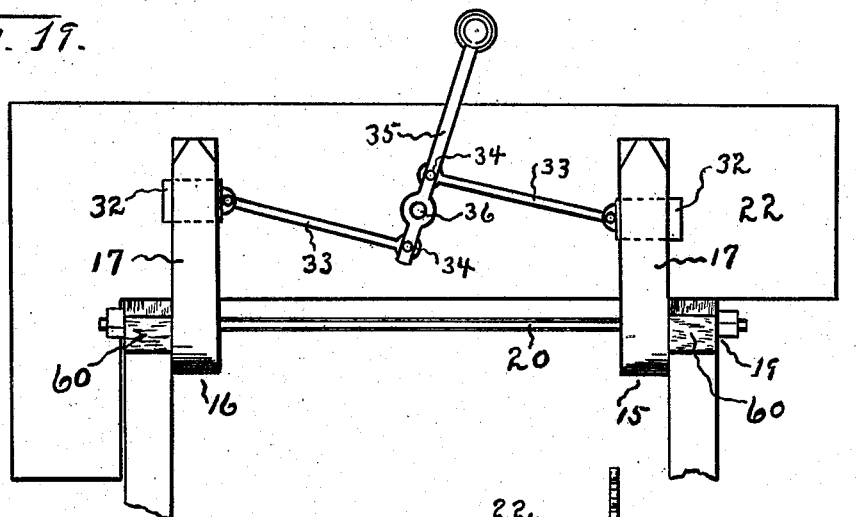
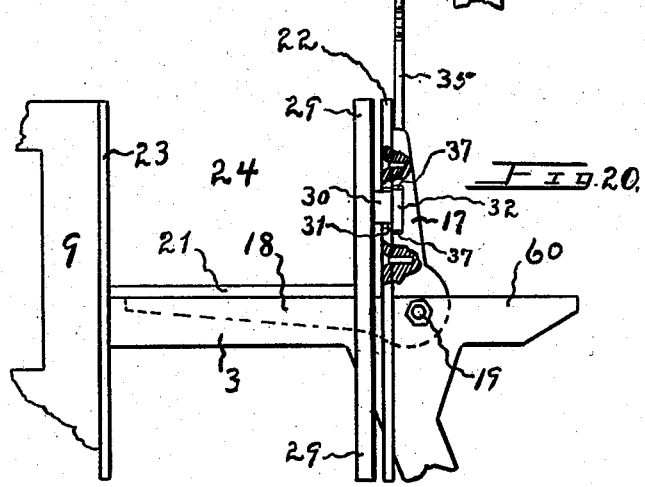
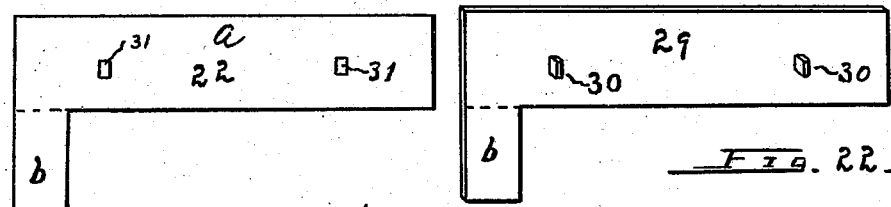
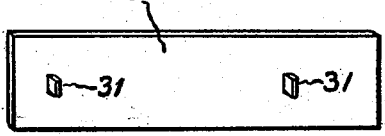
Witnesses
Inventor
George W. Buck,
Hiram A. Sturges,
By
Attorney

UNITED STATES PATENT OFFICE.

GEORGE W. BUCK, OF OMAHA, NEBRASKA.

CEMENT-BLOCK MACHINE.

No. 900,910.          Specification of Letters Patent.          Patented Oct. 13, 1908.

Application filed July 9, 1907. Serial No. 382,913.

*To all whom it may concern:*

Be it known that I, GEORGE W. BUCK, a citizen of the United States, residing at Omaha, in the county of Douglas and State of Nebraska, have invented certain new and useful Improvements in Cement-Block Machines, of which the following is a specification.

This invention relates to improvements in cement block machines, adapted for use in forming cement blocks for buildings, and has for its object the production of a machine which will consist of few parts and which may be economically constructed, also to present an arrangement of parts whereby building blocks may be formed with a small outlay of labor; also the invention has reference to a means for producing a particular form for corner blocks and for bonding, found to be of advantage.

The novel features of the invention are fully described herein, pointed out in the appended claims and illustrated in the drawings, wherein,—

Figure 1 represents a vertical front view of a cement block machine embodying my invention, showing the spreading-arms 33 in a released or drawn position. Fig. 2 is an end view of the parts shown in Fig. 1, the pallet being removed. Fig. 3 is an end view, being the end opposite that shown in Fig. 2, the door being closed and pallet removed. Fig. 4 is a view similar to that shown in Fig. 3, except the door is shown opened. Fig. 5 is a view somewhat similar to that shown in Fig. 1, the front part of the frame and pallet being removed to show use of one of the molds and to illustrate relative position of parts. Fig. 6 is a vertical end view of the machine, illustrating use of pallet and swinging pallet-arms or rock-lever. Figs. 7, 8, 9 and 10 are vertical side views of the molds employed, Fig. 9 being the mold used for forming corner blocks. Figs. 11 and 12 are plan views of part of a wall built by use of the blocks shown, and illustrating alternate courses. Figs. 13, 14 15 and 16 are side views of blocks made by the herein described machine when used in connection with the molds shown in Figs. 7, 8, 9 and 10. Fig. 17 is a plan view of my invention, arms 17 of the rock-levers being partly in section; also showing a fragment of a mold. Fig. 18 is a detail relating to Fig. 17., showing relative position of parts. Fig. 19 is a broken away, front view of a part of the invention showing the spreading-arms in an extended position. Fig. 20 is an end view of the parts shown in Fig. 19, looking to the left of that figure. Fig. 21 is a front view of the L-shaped pallet-sustaining plate 22, to clearly show apertures therein, to admit the lugs upon the pallet. Fig. 22 is a perspective view of the L-shaped pallet and lugs thereon. Fig. 23 is a perspective view of a rectangularly formed pallet, and lugs thereon, this pallet being used in connection with molds for forming the building blocks of lesser lengths.

Referring now to the drawings for a more particular description, numeral 1 indicates a cement block machine, and in order that the parts for forming the blocks may be supported operatively and conveniently, I construct a frame work, consisting of the horizontally-disposed supporting-arms 2 and 3, sustained by legs 4, 5, 6 and 7; legs 5 and 7 are extended upward to form arms 8 and 9, these arms being disposed at a right angle to supporting-arms 2 and 3, and, preferably, I employ braces 10 and 11 for connecting the legs at the ends of the machine, and in order that the parts may be sustained securely, I employ cross-pieces 12 and 13, which connect the rear legs, the front legs near their lower ends being connected by rod 14. It is intended by this construction to furnish an adequate support for the parts during the process of making the blocks, and it is preferred generally to cast the legs and supporting-arms integral for use upon each end of the machine.

I construct rock-levers 15 and 16, each having the arms 17 and 18, these arms being disposed at substantially a right angle for each rock-lever, the latter being pivotally mounted in the frame at 19, as by means of rod 20. Upon arms 18 is rigidly secured the rectangularly-formed base-plate 21, and upon arms 17 is rigidly secured the L-shaped pallet-sustaining plate 22; plates 21 and 22 are, therefore, disposed at a right angle with reference to each other; and upon arms 8 and 9 of the frame is rigidly and vertically secured the L-shaped molding-plate 23. Plates 22 and 23 are uniform in extent and shape, and when the parts are in normal position these plates are parallel with reference to each other, and each is formed as a rectangular plate *a* (Fig. 21.) having a lateral projection *b* formed at one of its ends and disposed within the plane of the rectangular portion; molding-plate 23 is stationary upon the frame, but plate 22 may have a swinging movement with arms 17.

The normal position of rock-levers 15 and 16 are as shown in Figs. 1, 2, 3 and 4, and the parts thus far described furnish a housing-space 24 (Fig. 4.) within which are placed any one of the molds hereafter described, the latter resting upon base-plate 21, this base-plate being supported upon arms 2 and 3.

Reference to Figs. 7, 8, 9 and 10 shows that each of molds 25, 26, 27 and 28 are provided with a bottom, but with no sides, and it will be seen that, when forming the blocks, other parts are depended upon in connection with the molds; while the molds form what might be called the bottom of the blocks, the sides are formed by plates presently to be described, and one end of the corner block is formed by a door, as will be explained.

I employ an L-shaped pallet 29, conforming to the shape of plate 22, and having lugs 30 extending outwardly from one of its sides, adapted to traverse apertures 31 of plate 22. Pallet 29 may be readily placed in operative position adjacent plate 22 and may be removed therefrom. It is intended that in operation, one side of the block will be formed by plate 23, this being true whether it is a wall block or corner block. In order that the mold may be firmly pressed against plate 23, I employ wedges 32 pivotally secured upon links 33, the opposite ends of said links being pivotally mounted at 34 upon compression-lever 35, the latter being pivotally mounted at 36 upon plate 22.

Arms 17 are recessed at 37 to receive wedges 32, and it will be understood that a swinging movement of lever 35 to the position shown in Figs. 17 or 19, will cause the wedges to be passed outwardly in recesses 37, these wedges contacting with the ends of lugs 30 of pallet 29, which will cause said pallet to be moved to a position adjacent plate 22 said movement being in a direction toward plate 23. While the blocks vary in length, they all have an equal width, the molds being also of equal width, and when wedges 32 are pressed outwardly by means of lever 35, pallet 29 is moved inwardly to a contact with edge $c$ of the mold 26, as shown in Fig. 17, and on account of this inward movement of the pallet, the opposite edge $d$ of the mold is pressed against plate 23. The contact with edges $c$ and $d$ just described of the mold, with plate 23 and with the pallet operates to retain the mold in a stationary position while being filled, and by this arrangement the mold, in conjunction with the pallet and plate 23 form the bottom and sides of a receptacle to contain cement material for the formation of a building block.

In forming blocks 41, 42 and 43 by use of molds 25, 26 and 28, respectively, the wall 38 (Figs. 7, 8, 10.) of the molds which forms the outer face 39 (Figs. 13, 14, 15.) of bonds 40 of said blocks, rests upon plate 21, and in order to support the mold in a horizontal position, I use any convenient support, as block 44 (Fig. 7.), this block being disposed contactingly between plate 21 and the lower surface of these molds.

In order to form the outer face of corner block 45, I construct door 46 having hinges mounted as at 47 upon the frame. This door is provided with a stop-lug 48 secured upon its free end, adapted to make contact with one end of plate 22 (Fig. 1.) to limit the inward travel of the door when being closed; upon the outer face of plate 22 I provide means for locking the door, as crank 49, and upon the outer face of the door is employed any convenient handle, shown at 50.

I construct the cover 51, pivotally mounted upon the frame as at 52 and having handle 54, and also provided with stop-lugs 53 which extend outwardly from its free end, said lugs being adapted to make contact with the upper edge of plate 22, at times hereafter named.

In operation, to form a corner block 45, mold 27 is employed; this mold has an outer wall 55 (Fig. 9.) adapted to form the outer surface 56 of bond 57 (Fig. 16.) of said corner block; this mold is placed in housing-space 24 so that wall 55 is disposed upon plate 21 (Fig. 5.), the terminal wall 58 of the mold passing below the plane of door 46, the opposite terminal of the mold extending above the plane of the cover, when the latter is closed. After the cover is thrown backward and the door has been closed, cement may be thrown upon the mold, lever 35 being first swung downward as shown in Figs. 19 and 20. The material is then agitated or tamped so that the block will be perfectly formed; it will be understood that the bottom of the block thus formed will conform to the shape of mold 27, and that the transversely disposed end 59 of the mold (Fig. 9.) will form one end of the block, door 46 forming the opposite end of said block; pallet 29 and plate 23 will form the sides of the block. Cover 51 is then closed, which forms the upper surface or face of the block. As thus formed, the portion indicated at $e$ (Fig. 16.) is the corner-bond, 57 is the wall-bond, and portion $f$ is formed between the planes of the lateral projections $b$ of plates 22 and 23. After the corner block has been formed, cover 51 is thrown backward, lever 35 is moved to the vertical position shown in Fig. 1, which releases the pallet from its compressed position; door 46 is then opened and the mold is moved endwise so that terminal wall 58 will make a clearance of vertical plate 23, after which arms 17 and the block are swung forward 90 degrees, so that plate 22 rests upon extensions 60 of supporting-arms 2 and 3, lever 35 being used to produce this swinging movement of the arms and block. The block is then removed from plate 22 while resting upon the pallet, and the block remains upon the pallet until it becomes hardened in a suitable degree. In the formation of building blocks a large number of pallets are used.

In forming blocks of a limited length, as blocks 42 and 43 the pallet indicated at 61 (Fig. 23.) of rectangular form may be used, this pallet being provided with lugs 31. The operation of forming blocks 41, 42 and 43 is the same as for forming the corner-block, except the mold, after formation of the block, is not moved endwise. As to the necessity of causing an endwise movement of the mold while forming a corner block, it should be remembered that the L-shaped plate 23 is stationary upon the frame, and is vertically-disposed; the projection $f$ of the corner block at this time occupies the space between the projection $b$ of the pallet and a similar projection of plate 23, and when arms 17 of the rock-levers, together with a corner block have the forward swinging movement, heretofore described, it is clear that the projection $f$ must make a clearance of plate 23 during this swinging movement; for this reason only, and only while forming corner blocks, mold 27 must be moved endwise until wall 58 (Fig. 5.) passes horizontally beyond the plane of plate 23.

It will be seen, by reference to Figs. 11 and 12, that wall 62 may be constructed by use of blocks 41, 42, 43 and 45, said wall being composed of exterior and interior layers; that air-spaces $g$ will be formed and that bonds 40 will overlap; also it will be seen that bonds 57 of the corner block will overlap bonds 40 of other wall blocks as shown; and it will be appreciated that the layers of blocks forming the inner surface $h$ of the wall do not extend to the exterior of the wall, the intention being to prevent moisture or frost from penetrating to the interior of the wall.

The parts thus described are few in number and the machine may be economically constructed; it is also considered durable, and by its use blocks for building purposes may be quickly formed, with a small outlay of labor.

Having described my invention, what I claim as new and desire to secure by Letters Patent, is,—

1. In a cement block machine, the combination with a supporting frame having a stationary mold-side and provided with rock-levers having a pair of oppositely-disposed arms adapted to have a transverse movement with reference to said stationary mold-side, of an apertured pallet-sustaining-plate upon one of the oppositely-disposed arms of each of said rock-levers; a pallet disposed substantially parallel with and adjacent said apertured pallet-sustaining-plate and having lugs adapted to have a seating within the apertures of said pallet-sustaining-plate; a molding-plate supported upon the other oppositely-disposed arm of each of said rock-levers and adapted to have a seating intermediate said stationary mold-side and said pallet; means between one of the oppositely-disposed arms of each of said rock-levers and the lugs of said pallet to increase the adjacent distance between the apertured pallet-sustaining-plate and said pallet, and means to actuate said rock-levers to remove said molding-plate from a position intermediate said stationary molding-plate and said pallet.

2. In a cement block machine, the combination with a supporting frame having a stationary, L-shaped mold-side, and provided with rock-levers having a pair of oppositely-disposed arms adapted to have a transverse movement with reference to said stationary, L-shaped mold-side, of an apertured, L-shaped pallet-sustaining-plate upon one of the oppositely-disposed arms of each of said rock-levers; an L-shaped, pallet disposed substantially parallel with and adjacent said apertured, L-shaped pallet-sustaining-plate and having lugs adapted to have a seating within the apertures of said L-shaped, pallet-sustaining-plate; a molding-plate supported upon the other oppositely-disposed arm of each of said rock-levers and adapted to have a seating intermediate said stationary, L-shaped mold-side and said L-shaped pallet; a swinging member upon the supporting-frame adapted to make a closure with one of the ends of the molding-plate between a terminal of said stationary, L-shaped mold-side and a terminal of said L-shaped pallet; means between one of the oppositely-disposed arms of each of said rock-levers and the lugs of said L-shaped pallet to increase the adjacent distance between the apertured, L-shaped pallet-sustaining-plate and said L-shaped pallet, and means to actuate said rock-levers to remove said molding-plate from a position intermediate said stationary, L-shaped mold-side and said L-shaped pallet.

In testimony whereof I have affixed my signature in presence of two witnesses.

GEORGE W. BUCK.

Witnesses:
N. FINGES,
ALBERT SWARTZLANDER.